United States Patent
Olesen

(10) Patent No.: US 8,120,759 B2
(45) Date of Patent: Feb. 21, 2012

(54) OPTICAL TRANSMISSION STRAIN SENSOR FOR WIND TURBINES

(75) Inventor: Ib Svend Olesen, Randers SØ (DK)

(73) Assignee: Vestas Wind Systems A/S, Randers SV (DK)

( * ) Notice: Subject to any disclaimer, the term of this patent is extended or adjusted under 35 U.S.C. 154(b) by 0 days.

(21) Appl. No.: 12/935,728

(22) PCT Filed: Mar. 16, 2009

(86) PCT No.: PCT/DK2009/050060
§ 371 (c)(1),
(2), (4) Date: Oct. 22, 2010

(87) PCT Pub. No.: WO2009/121367
PCT Pub. Date: Oct. 8, 2009

(65) Prior Publication Data
US 2011/0054696 A1    Mar. 3, 2011

Related U.S. Application Data

(60) Provisional application No. 61/040,756, filed on Mar. 31, 2008.

(30) Foreign Application Priority Data

Mar. 31, 2008 (DK) ................................ 2008 00472

(51) Int. Cl.
*G01B 11/16* (2006.01)
*F03D 9/00* (2006.01)

(52) U.S. Cl. ............... 356/32; 290/44; 290/55; 700/287

(58) Field of Classification Search .................. 700/275, 700/286, 287; 356/32, 34, 73.1, E11.016; 290/44, 55; 702/34; 416/1, 61, 146 R
See application file for complete search history.

(56) References Cited

U.S. PATENT DOCUMENTS

| 4,297,076 A | 10/1981 | Donham et al. |
| 6,337,737 B1 | 1/2002 | Chang et al. |

(Continued)

FOREIGN PATENT DOCUMENTS

GB    2440955 A    2/2008

(Continued)

OTHER PUBLICATIONS

European Patent Office, International Search Report issued in related International application No. PCT/DK2009/050060 dated May 26, 2009.

(Continued)

*Primary Examiner* — Charles Kasenge
(74) *Attorney, Agent, or Firm* — Wood, Herron & Evans, LLP

(57) ABSTRACT

The invention relates to a broad band optical strain sensing system for a wind turbine. The strain sensing system includes an optical fiber with an input at one end and an output at the opposite end. The optical fiber is provided with Bragg sensors between the input and the output. By injecting light at the input of the fiber, measuring the spectral intensity distribution of at the output of the fiber and determining spectral locations of intensity notches in the spectral intensity distribution, it is possible to determine strain values at the locations of the Bragg sensors from the transmitted light.

12 Claims, 7 Drawing Sheets

U.S. PATENT DOCUMENTS

| | | | |
|---|---|---|---|
| 7,379,169 B1 * | 5/2008 | Kraemer et al. | 356/73.1 |
| 7,520,176 B1 * | 4/2009 | Ko et al. | 73/794 |
| 2010/0209248 A1 * | 8/2010 | Volanthen et al. | 416/61 |

FOREIGN PATENT DOCUMENTS

| | | |
|---|---|---|
| JP | 2001183114 A | 7/2001 |
| WO | 2005071382 A1 | 8/2005 |
| WO | 2006094351 A1 | 9/2006 |
| WO | 2008020240 A1 | 2/2008 |

OTHER PUBLICATIONS

European Patent Office, International Preliminary Report on Patentability issued in related International application No. PCT/DK2009/050060 dated Sep. 9, 2010.

Kersey, et al., "Fiber Grating Sensors", Journal of Lightwave Technology, vol. 15, No. 8, Aug. 1997.

The Danish Patent and Trademark Office, Office Action issued related Denmark patent application No. PA 2008 00472 dated Nov. 4, 2008.

* cited by examiner

OPTICAL TRANSMISSION STRAIN SENSOR FOR WIND TURBINES

FIELD OF THE INVENTION

The invention relates to strain detection, in particular to strain detection using optical sensors.

BACKGROUND OF THE INVENTION

Measurements of strains in wind turbine components provide valuable insight of the mechanical loads of components of wind turbines, for example turbine blades.

It is know to use strain gauge sensors and optical sensors in wind turbines. However, due to the very harsh operating conditions of wind turbines, the strain sensors should be very robust.

WO08020240 discloses a wind turbine blade incorporating an optical fibre configured for structural monitoring of the turbine blade. The optical fibre comprises at least one strain sensor. One end of the optical fibre is an output point, which is connected to a data processing device configured to process signals from the strain sensor. The other end of the optical fibre is an alternative output point, which is also connectable to the data processing device, such that in the event of a breakage in the optical fibre, signals from the strain sensor are available from at least one of the output points.

Whereas WO08020240 discloses a strain sensor having two output points so that the strain sensor is operable in the event of a breakage in the optical fibre, the strain sensor in WO08020240 is relatively complex. Hence, an improved strain sensor with a more robust design would be advantageous.

SUMMARY OF THE INVENTION

Accordingly, the invention preferably seeks to mitigate, alleviate or eliminate one or more of the above mentioned disadvantages singly or in any combination. In particular, it may be seen as an objective of the present invention to provide a strain sensor that solves the above mentioned problems by providing a simple and robust optical design of a strain sensor.

This object and several other objectives are obtained in a first aspect of the invention by providing a method for sensing strain in a component in a wind turbine comprising an optical sensor system, said method comprising the steps of:
inputting an input optical signal into a plurality of optical fibres of said sensor system, each of said optical fibres comprising one or more fibre Bragg grating sensors,
measuring a spectral intensity distribution of a transmitted output optical signal influenced by said one or more sensors, in response to the input optical signal, with a plurality of light detectors, said light detectors being operatively connected to the optical fibres with first and second detectors connected to respective first and second fibres, and with said first and second detectors being located downstream relative to said one or more sensors of said respective first and second fibres, and
processing the measured output optical signal in a control unit in order to establish a value of a strain in the component.

The invention is particularly, but not exclusively, advantageous for obtaining a simple and robust design of a fibre optical strain sensor capable of establishing strain values on basis of light that is transmitted through the fibre.

Accordingly, light is inputted at an input end of a fibre and the light outputted from the opposite fibre end is measured in order to determine a strain value of a component of the wind turbine. Between the input end and the output end of the fibre one or more strain sensors, such as fibre Bragg sensors, are provided. Since the spectral transmission characteristics of the Bragg sensors depends on the strain of the fibre, strain values of the one or more Bragg sensors can be determined from the transmitted light.

It may be an advantage to determine strain values from transmitted light, since it may be enable a simpler optical design as compared to measuring light that has been reflected from a Bragg sensor.

It is understood that inputting an input optical signal into a plurality of optical fibres of the sensor system may be achieved by use of a plurality of input optical sources individually coupled to the fibres, i.e. by coupling first and second sources to respective first and second fibres. Alternatively a single input optical source may be coupled to all fibres using e.g. a fibre splitter.

It may be advantageous to use a plurality of light detectors with first and second detectors connected to respective first and second fibres for measuring the output spectral intensity distributions of the fibres, since the use of a detector for each fibre-output may facilitate a simpler and more reliable detection system.

In an embodiment the output optical signal may comprise at least one notch representing a minimum light intensity, where the strain value may be established by determining a spectral location of an intensity notch in the measured spectral intensity distribution. Thus, by determining a spectral location of an intensity notch in the transmitted light, where the intensity notch is cause by filter effect of the Bragg sensor, it is possible to determine a strain value by comparing the measured spectral location with a wavelength of the Bragg sensor when it is not strained.

In another embodiment the spectral intensity distribution of the output optical signal may be measured with the light detector over a spectral range covering a spectral operating range of the one or more grating sensors. Since the fibre may comprise a plurality of grating sensors each having different operating filter wavelengths, the entire operating spectral range of the granting sensors may be measured with a light detector capable of measuring intensities at all wavelengths within that operating spectral range.

In an embodiment the at least one optical fibre is operatively connected to the component of the wind turbine, for example by bonding the fibre to the component or integrating the fibre with the component.

In an embodiment the input optical signal is a broad band optical signal with a spectral distribution that is broader than a spectral operating range of the one or more grating sensors. In order to detect changes in the transmittivity of all the grating sensors for, the spectral width of the input optical signal should be broader than the spectral operating range of the sensors.

In an embodiment the light intensity of the transmitted output optical signal may be compared with a light intensity of the input optical signal. It may be an advantage to compare the output optical signal with the input optical signal, since this may provide a method for compensating for intensity variations of the input optical signal.

In an embodiment the input optical signal is alternately inputted to one of at least two optical fibres using time division, where the output optical signals from the at least two optical fibres are combined into a single output optical signal. When the strain sensor comprises a plurality of fibres, it may be an advantage to inject input light to one fibre at a time, since this may enable detection of spectral intensity profiles from all fibres using a single spectral detector.

In an embodiment the value of the strain is supplied to the wind turbine controller for use in controlling the wind turbine.

In an embodiment the value of the strain is used in the pitch control of at least one wind turbine blade and/or in the power generation control of the wind turbine. For example, the knowledge of strains in a turbine blade may be used for optimising power generation by adjusting the pitch.

In a second aspect, the invention relates to an optical strain sensing system for a wind turbine component, the strain sensing system comprising a plurality of optical fibres which are operatively connected to said turbine component and each optical fibre comprising one or more fibre Bragg grating sensors, an input optical signal source connected to said optical fibres at a location upstream to said one or more sensors, a plurality of spectral light detectors operatively connected to the optical fibres with first and second detectors connected to respective first and second fibres, and with said first and second detectors being located at a location downstream of the one or more sensors of said respective first and second fibres, said light detectors being arranged for measuring transmitted output optical signals influenced by one or more of said sensors of said fibres, and at least one control unit for processing the measured output optical signals in order to establish a value of a strain in the component.

Thus, a spectral light distribution detector may be operatively connected to each of the optical fibres and located downstream relative to the sensor in each optical fibre. When two or more optical fibres are used, individual strain sensing fibres may be used for different components of the wind turbine so that the spectral intensity profiles emitted by the optical fibres can be measured by detectors connected to each of the fibres for determining strain values of the corresponding wind turbine components.

It is understood that a wind turbine component may comprise different components such a wind turbine tower, a nacelle, a rotor shaft, a rotor comprising rotor blades, or a blade of a rotor.

In an embodiment, the wind turbine component comprises at least first and second turbine blades, and the first and second fibres are fixed to the respective first and second turbine blades.

An embodiment of the strain sensing system comprises means for implementing a method according to any of the preceding aspects and embodiments.

An embodiment of the strain sensing system comprises data storage means for keeping record of the strains in the wind turbine component in order to estimate remaining safe working condition of the component. Accordingly, stored strain values may be integrated, summed or processed otherwise for estimating a value of the remaining safe working condition of the component.

In a third aspect, the invention relates to the use of a method or a strain sensing system according to any of the preceding aspects and embodiments in a wind turbine component such as a wind turbine blade, a tower, a shaft, a bearing and/or a gearbox in order to sense strain.

In a fourth aspect, the invention relates to a wind turbine comprising a strain sensing system according to the second aspect.

The first, second, third and fourth aspects of the present invention may each be combined with any of the other aspects. These and other aspects of the invention will be apparent from and elucidated with reference to the embodiments described hereinafter.

In summary, the invention relates to a broad band optical strain sensing system for a wind turbine. The strain sensing system includes an optical fibre with an input at one end and an output at the opposite end. The optical fibre is provided with Bragg sensors between the input and the output. By injecting light at the input of the fibre, measuring the spectral intensity distribution of at the output of the fibre and determining spectral locations of intensity notches in the spectral intensity distribution, it is possible to determine strain values at the locations of the Bragg sensors from the transmitted light.

BRIEF DESCRIPTION OF THE FIGURES

The present invention will now be explained, by way of example only, with reference to the accompanying Figures, where.

DESCRIPTION OF AN EMBODIMENT

Figure 1:
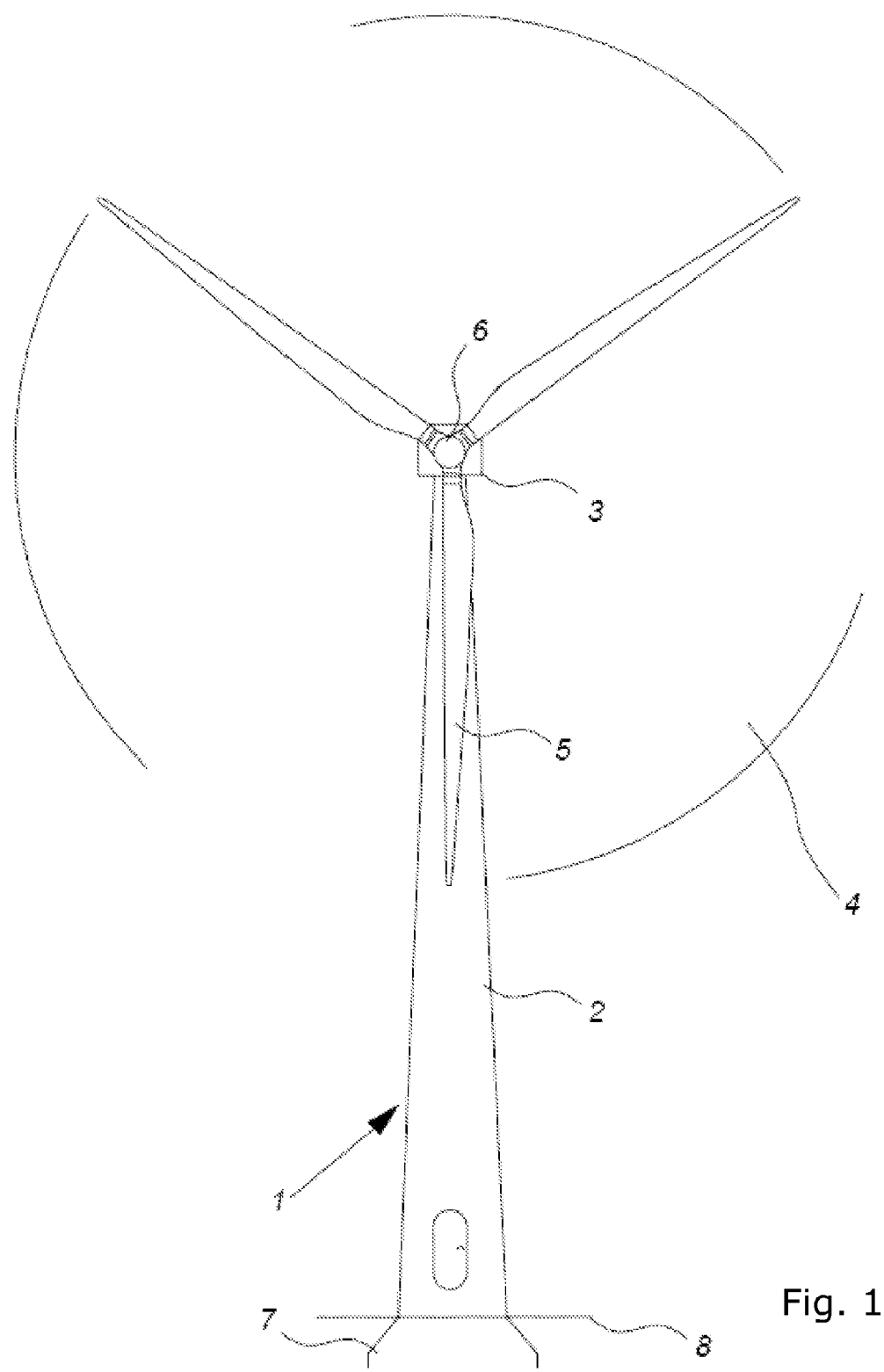
FIG. 1 illustrates a wind turbine 1.

FIG. 1 illustrates a wind turbine 1, comprising a wind turbine tower 2 and a wind turbine nacelle 3 positioned on top of the tower 2. The wind turbine rotor 4 comprises at least one wind turbine blade e.g. three wind turbine blades 5 as illustrated in the figure. The rotor is mounted on a hub 6, which is connected to the nacelle 3 through the low speed shaft extending out of the nacelle front.

Figure 2A:
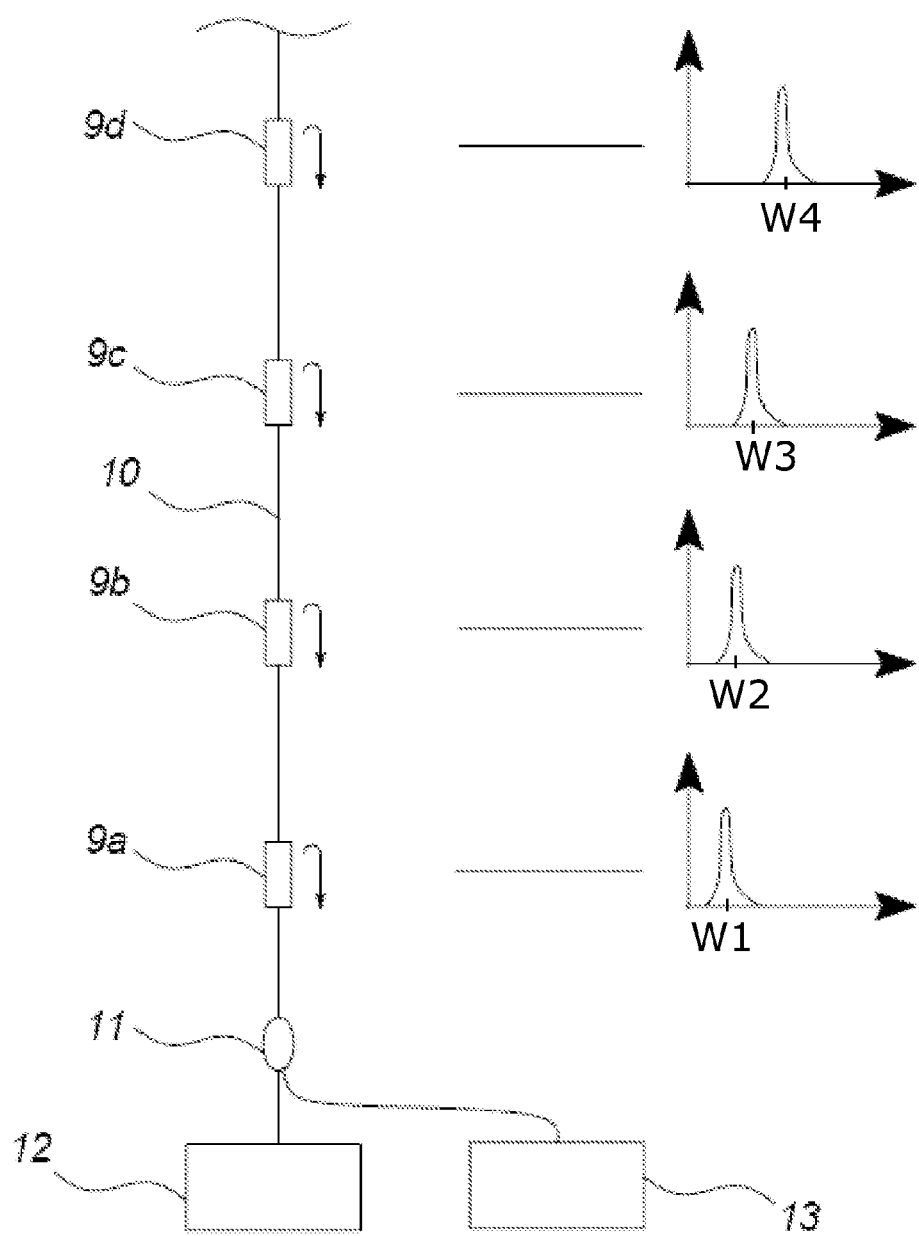
FIG. 2A illustrates a known fibre Bragg grating strain sensing system.

FIG. 2A shows a known strain sensing system using the principle of fibre Bragg gratings including an optical fibre 10 with a number of FBG sensors 9a-9d distributed in the fibre.

Figure 2B:
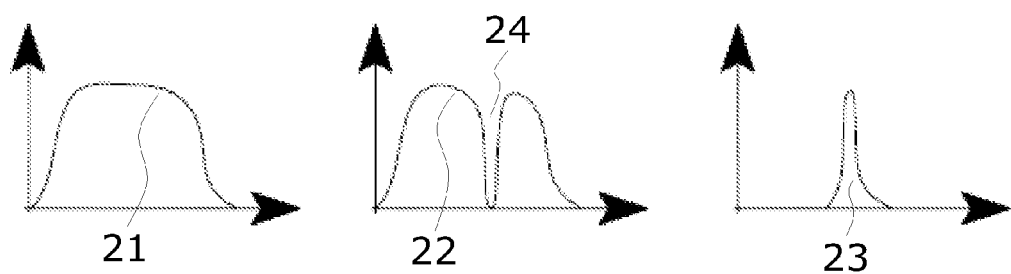
FIG. 2B shows spectral intensity distributions.

FIG. 2B shows a spectral intensity distribution 21 of light inputted to the fibre 10, a spectral intensity distribution 22 of light which has been transmitted through a FBG sensor 9a, and a spectral intensity distribution 23 of light which has been reflected by a FBG sensor 9a. The notch 24 in the transmission profile 22 corresponds to the spectral part of the inputted light that is reflected, i.e. the notch 24 corresponds to the reflection profile 23. A spectral intensity distribution gives the optical radiation amplitudes or optical intensities for a range of wavelengths.

In FIG. 2A, a light source 12 supplies an input signal to the proximate end of the fibre prior to an optical splitter 11. An example of the spectral intensity distribution of the input signal is illustrated by the input profile 21 in FIG. 2B.

Each FBG sensor 9a-9d in FIG. 2A reflects a fraction of the input signal of a specific wavelength back towards the light source 12. The input signal may have a spectral intensity distribution 21 and the reflected signal may have a spectral intensity distribution as illustrated by the reflection profile 23 in FIG. 2B. The spectral intensity distribution of the light transmitted by one of the FBG sensors 9a-9d is illustrated by the transmission profile 22 in FIG. 2B, where the spectral distribution of the notch 24 of weak intensities corresponds to the spectral distribution of the reflection profile 21. Accordingly, the spectral location of the notch 24 is the same as the spectral location of the reflection profile 23—and e.g. the minimum intensity of the notch 24 has the same, or almost the same, spectral location of the maximum intensity of the reflection profile 23.

For convenience, it may be said that a sensor 9a-9d has a specific wavelength and reflects a specific wavelength, e.g. wavelength W1 for sensor 9a. However, in fact the sensor reflects a spectral wavelength distribution which may have a centre wavelength or a peak wavelength of W1. FIG. 2 illustrates such spectral distributions with distinct centre wavelengths of W1-W4 corresponding to sensors 9a-9d, respectively.

Further, each FBG sensor transmits a signal toward the next sensor 9b wherein the transmitted signal has a notch 24 corresponding to the specific wavelength of the preceding sensor 9a.

The Y-connector 11 lets the input light pass on to the FBG sensors but deflects and sends the reflected signals from the sensor 9a-9d with wavelengths W1-W4 to an interrogator 13 which detects the signals.

In order to be able the determine strain values from reflected light, the sensor system illustrated in FIG. 2 requires both a Y-connector 11 and an optical termination (not illustrated) of the distal fibre end for avoiding reflections from the distal fibre end. However, the Y-connector 11 and the optical termination increases the complexity of the strain sensing system and, therefore, it may be beneficial to avoid the use of such optical components.

Furthermore, determining strain values from reflected light may require a high optical power output of the light source 12 to compensate for optical power losses in the Y-connector 11 where both the input light and the reflected light is damped due to non-perfect transmission characteristics of the Y-connector. Accordingly, it may be desirable to have a strain sensing system which requires lower input power of the input light source 12 as compared to the reflection based strain sensor.

Figure 3:
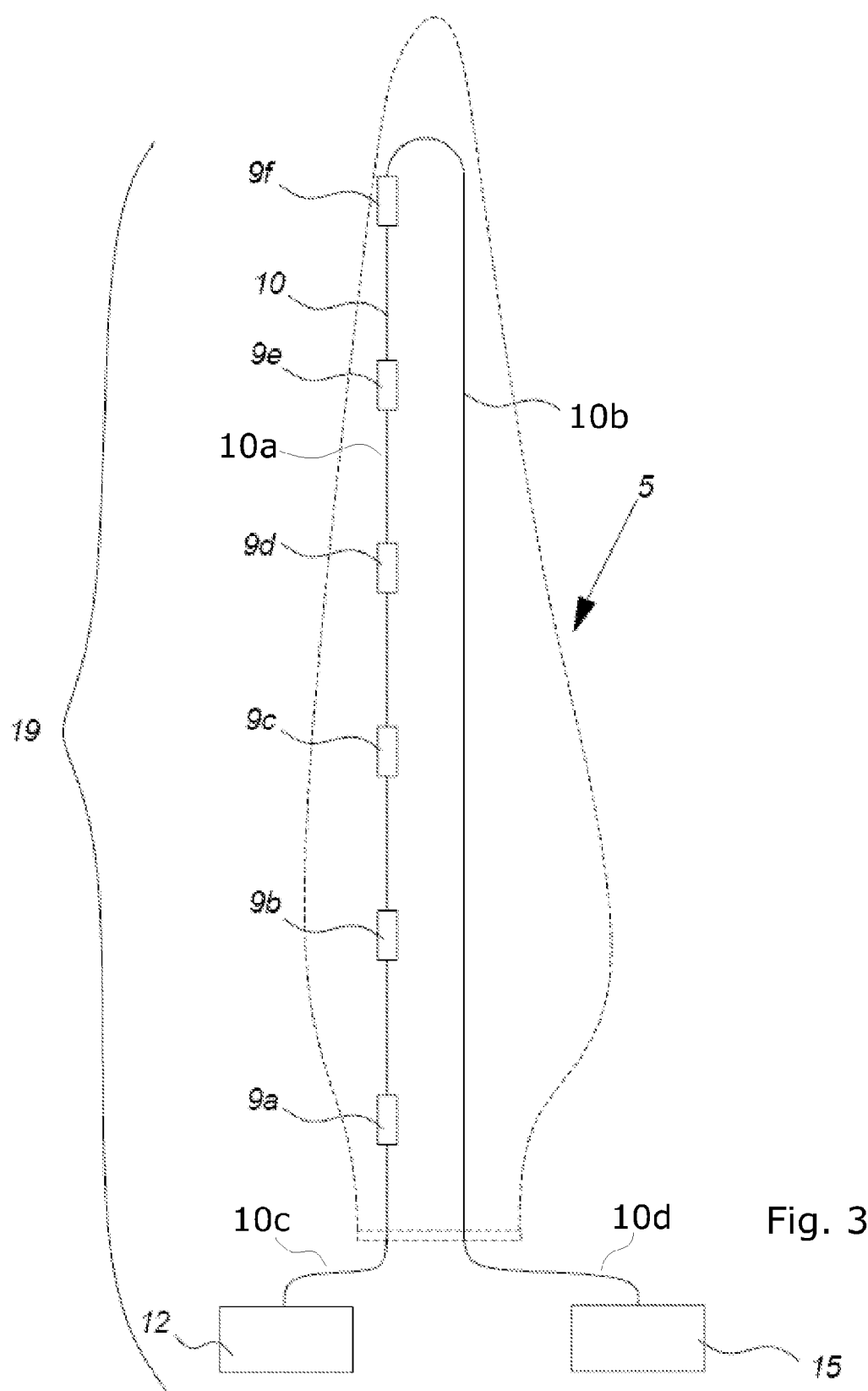
FIG. 3 illustrates a strain sensing system based on transmitted light.

FIG. 3 illustrates an embodiment of an optical strain sensing system 19 for a wind turbine blade 5 according to the invention. The optical fibre 10 comprising FBG sensors 9a-9f is operatively connected to blade 5. The optical fibre 14 may be glued to the outer surface or the inner surface of the hollow blade structure.

Alternatively, the fibre may be integrated into the composite material used for fabricating the blade 5. The optical fibre 10 may be a single fibre or the fibre 10 may be constituted by sections of fibres that are optically connected to each other. In an embodiment, the first part 10a of the optical fibre guiding the light from the light source 12 to the distal end of the blade comprises the sensors 9a-9f, whereas the second part 10b of the fibre, which does not comprise any sensors, guides the light back the light detector 15.

In this context, light emitted by the light source 12 should be construed to include visible light or near visible light, ultraviolet (UV) light and/or infrared (IR) light. In general light may be construed as electro-magnetic radiation in the visible or near-visible wavelength range of 350 nm to 800 nm, as well as UV-light or near UV-light in the wavelength range down to approximately of 200 nm, and IR-light or near IR-light in the wavelength range up to approximately 1.7 micrometers.

The optical fibre 10 may be construed as a thin, transparent fibre, usually made of glass (silica) or plastic, for transmitting light along its axis, by the process of (total) internal reflection. The fibre consists of a denser core surrounded by a cladding layer. Optical fibres are typically provided as a multimode fibre or single mode fibre, however also special-purpose optical fibres may be provided.

The sensors 9a-9f may be individual sensor elements inserted in the optical fibre 10, or the sensors 9a-9f may be formed as variations of the refractive index in the fibre 10.

The fibre 10 may have an input end 10c and an output end 10d, which may be extended into the hub 6 of the wind turbine and connected to the light source 12 and the light detector 15, respectively.

The input optical signal source 12 is connected to the optical fibre 5 at a location upstream to the sensors 9a-9f, and the light detector 15 is connected to the optical fibre at a location downstream of the sensors 9a-9f for measuring transmitted light influenced by the filtering effect of the sensors 9a-9f.

Figure 4A:
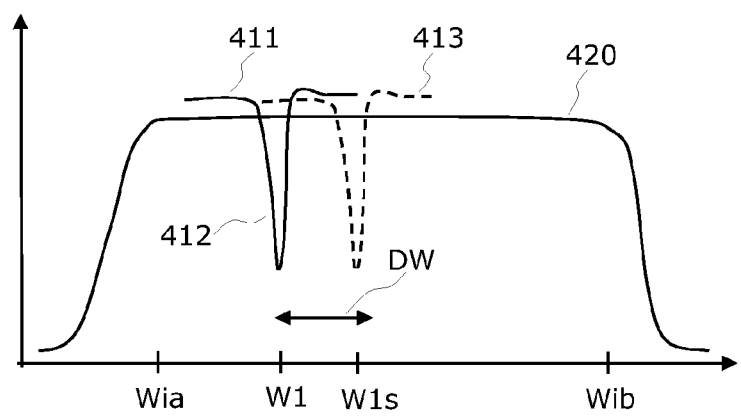
FIGS. 4A-4C shows spectral profiles of inputted light and transmitted light.

FIG. 4A shows the spectral intensity distribution 420 of the input optical signal from the input source 12. The input optical signal is a broad band signal having a spectral width of Wib minus Wia. FIG. 4A also shows the transmission filter characteristic 411 of a FBG sensor 9a. The transmission characteristic shows a minimum transmittivity at the wavelength W1 and a filter notch 412 in the vicinity of the wavelength W1. The abscissa of the coordinate system represents wavelength and the ordinate represents either power or intensity of the input signal or the signal transmitted through the FBG sensor 9a.

When the FBG sensor 9a is exposed to strain, the minimum transmittivity of the sensor and, thereby, the intensity notch 412, is displaced from wavelength W1 to wavelength W1s as shown by the displaced transmission characteristic 413. Accordingly, by determining the displaced wavelength W1a or the wavelength displacement DW, the strain of the FBG sensor can be determined.

Figure 4B:
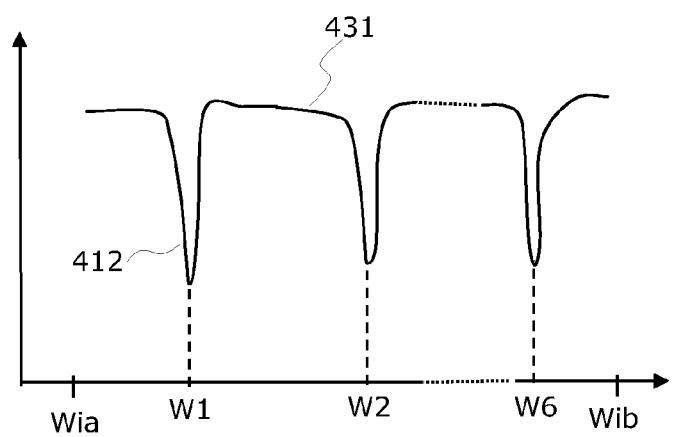

FIG. 4B shows a measured spectral intensity distribution of a transmitted output optical signal influenced by a plurality of FBG sensors 9a-9f, where a first sensor 9a causes a notch 412 with wavelength W1, a second sensor 9b causes a notch 412 with wavelength W2, and e.g. a sixth sensor 9f causes a notch 412 with wavelength W3.

Displacements DW of the notches in spectral intensity distributions 411, 431 can be determined by monitoring the light transmitted through the one or more FBG sensors 9a-9f with a spectral light detector 15 operatively connected to an output end of the optical fibre 10.

Thus, when output optical signal from the fibre 10 comprises at least one notch representing a minimum light intensity, the strain value of a sensor 9a can be established by determining a spectral location, i.e. a wavelength W1s, of the intensity notch in the measured spectral intensity distribution.

The spectral light detector 15, for example a spectrum analyser or an interrogator, detects the optical power at different wavelengths, or rather different small intervals of wavelengths and, thereby, is capable of determining a spectral profile 431. The spectral light detector 15 may use a dispersive element, e.g. a prism, for spatially separating different wavelengths so that the different wavelengths can be measured with different light sensors, e.g. pixels of a CCD sensor.

By processing the measured output optical signal from the spectral detector 15 in a control unit, it is possible to determine the wavelength W1s where the output optical signal has a minimum optical power. By comparing the determined wavelength W1s with the nominal wavelength W1 representing the notch-wavelength when the FBG sensor is not strained, the wavelength difference DW and, thereby, the actual strain at the location of the sensor 9a can be determined. Clearly, by determining wavelength differences DW at different displaced wavelengths W1s-W6s, the strain values at the locations of the corresponding strain sensors 9a-9f can be determined.

The processing of the measured output optical signal from spectral detector 15 may be performed by a processor integrated with the detector 15 or by a processor, e.g. a computer, connected to the detector 15. The determination of displaced wavelengths W1s of notches 412 may be performed by mathematically analysing data samples of the spectral profile 411, 431, for example by determining a minimum intensity value, averaging intensity values, or using curve fitting.

The spectral operating range of one or more grating sensors 9a-9f comprised by a fibre 10 corresponds to the spectral range spanned by the nominal wavelengths W1-Wn of FBG sensors. The spectral operating range of e.g. four sensors 9a-9d may, as an example, be a range from 1120 nm to 1180 nm, where the nominal wavelengths of individual sensors are equally spaced within the spectral operating range.

The input signal should be a broad band optical signal with a spectral distribution that is broader than a spectral operating range of the sensors 9a-9f in a given application. Thus, when the spectral operating range is from 1120 nm to 1180 nm, the broad band input source 12 could have a spectral range from e.g. 1000 nm to 1300 nm.

The wavelength difference DW between zero strain and maximum strain for a sensor may as an example be 2 nm. The width of an intensity notch 412 may as an example be 0.1 nm.

In order to measure several intensity notches 412 of a spectral intensity distribution 431, the light detector 15 should have spectral detecting range at least covering the spectral operating range of the sensors 9a-9f.

Figure 4C:
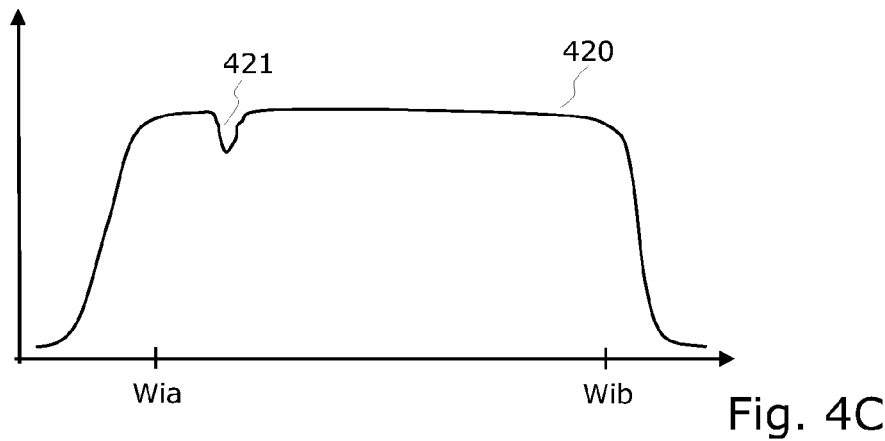

FIG. 4C shows an example of the input light which has an intensity spectrum 420 that is not flat over the spectral operating range of the sensors due to variations 421 of the intensity. Such intensity variations 421 of the input light could be wrongly detected as an intensity notch 412 from a sensor, or could affect the determination of spectral locations of intensity notches 412. However, by comparing the measured light intensity of the transmitted output optical signal with a measured light intensity of the input optical signal, it is possible to at least partly eliminate the negative effect of input intensity variation 421 on the accuracy of strain results.

As an example, the comparison of the output optical signal and the input optical signal may comprise calculating the ratio of the intensity of the output optical signal at a give wavelength with the intensity of the input optical signal at the same wavelength. In this way the negative effect of an input intensity variation 421 is cancelled since input intensity variation 421 is present both in the input and output optical signals. The measurement of the spectral intensity distribution of the input light may determined by measuring a fraction of the input light by branching off part of the light from the input source 12, e.g. by use of a fibre splitter, before the light is transmitted through the sensors 9a-9f. Alternatively, the spectral intensity distribution of the input light may be measured by the output detector 15 in a state where the FBG sensors are only weakly affected by mechanical stresses. In another alternative, the spectral intensity distribution of the input light is measured only once, e.g. during fabrication of the input light source 12, and stored as a digital file for use by the control unit for calculating the ratio of the output optical signal and the stored input optical signal.

The filter transmission characteristic 411 of a FBG sensor is created by alternating or periodic variations in the refractive index of the fibre 10. Thus, the FBG sensor 9a may be seen as number of sections of the fibre 10 having varying values of the refractive index. In order to obtain a FBG sensor with a minimum transmission wavelength W1 of e.g. 1500 nm, the distance between adjacent fibre sections with different refractive indices should satisfy a given Bragg condition. Assuming a refractive index of approximately 1.5 of one of the sections, the distance between succeeding sections—or equivalently, the period of periodic variations in the refractive index—is approximately 500 nm, i.e. approximately one third of the wavelength W1.

Accordingly, the grating period of the periodic variations in the refractive index relates to the nominal filter wavelength W1 of a FBG sensor and, thereby, the wavelength of the narrowband input optical signal. Wavelengths of the input optical signal may range from 300 nm to 6000 nm or preferably from 600 nm to 2000 nm. Since the grating period depends on the refractive index of the fibre and other factors, such as desired filter characteristics, the grating period for FBG sensors used according to embodiments of this invention may range from 100 nm to 5000 nm. Grating periods in the range from 100 nm to 5000 nm may be used with wavelengths of the input optical signal ranging from 300 nm to 15000 nm, as explained above.

The FBG sensor and, thereby, the grating period, may be made by different processing of a fibre. For example, the fibre can be illuminated with UV light to form gratings. Accordingly, different grating periods may be selected according to the grating processing of a fibre. For example, different FBG sensors in a fibre may have different grating periods generated by the processing of the fibre.

Thus, in an embodiment of a method for sensing strain and an embodiment of an optical strain sensing system, the grating period of periodic variations in the refractive index of a Bragg grating sensor may be within the range from 100 nm to 5000 nm, preferably within the range from 100 nm to 1000 nm or more preferred within the range from 200 to 700 nm.

The transmitted output optical signal is influenced by the one or more FBG sensors, in response to the input optical signal. Thus, the influence by the FBG sensors on the output optical signal is determined at least in part by the grating period of a FBG sensor. The grating period may be selected to improve detection by the detector located downstream relative to the one or more FBG sensors, for example by adapting the notch-width of a notch 412 to the spectral width (Wib minus Wia) of the the input optical signal, i.e. by making the notch-width sufficiently small to give room for a larger number of non-overlapping notches 412 within the spectral width of the input signal.

Detection by the downstream detector may also be improved for example by selecting the grating period to minimise the minimum transmittivity of a FBG sensor at wavelength W1. Thus, if there is a large difference between the minimum transmittivity and the transmittivity outside the filter notch, detection of transmitted light may be made with greater accuracy.

Thus, the grating period of the FBG sensors may be selected to particularly improve detection by a downstream detector 15, 15a-c according to methods for sensing strain and optical strain sensing systems of the invention.

In a method for sensing strain and a strain sensing system, where a light intensity of the output optical signal is measured with the light detector over a frequency band selected according to the grating sensors, the frequency band may given according to the range of wavelengths covering distinct notch wavelengths L1 of different FBG sensors. Accordingly, the distinct grating periods may be selected to match a given frequency band of the light detector 15, 15a-c.

In a method for sensing strain and a strain sensing system, the minimum light intensity of at least one notch of the output optical signal is determined at least in part by the grating period of at least on FBG sensor. Thus, the minimum light intensity of a notch may be determined by selecting a given grating period in order to obtain a particular transmission profile 411.

Figure 5:
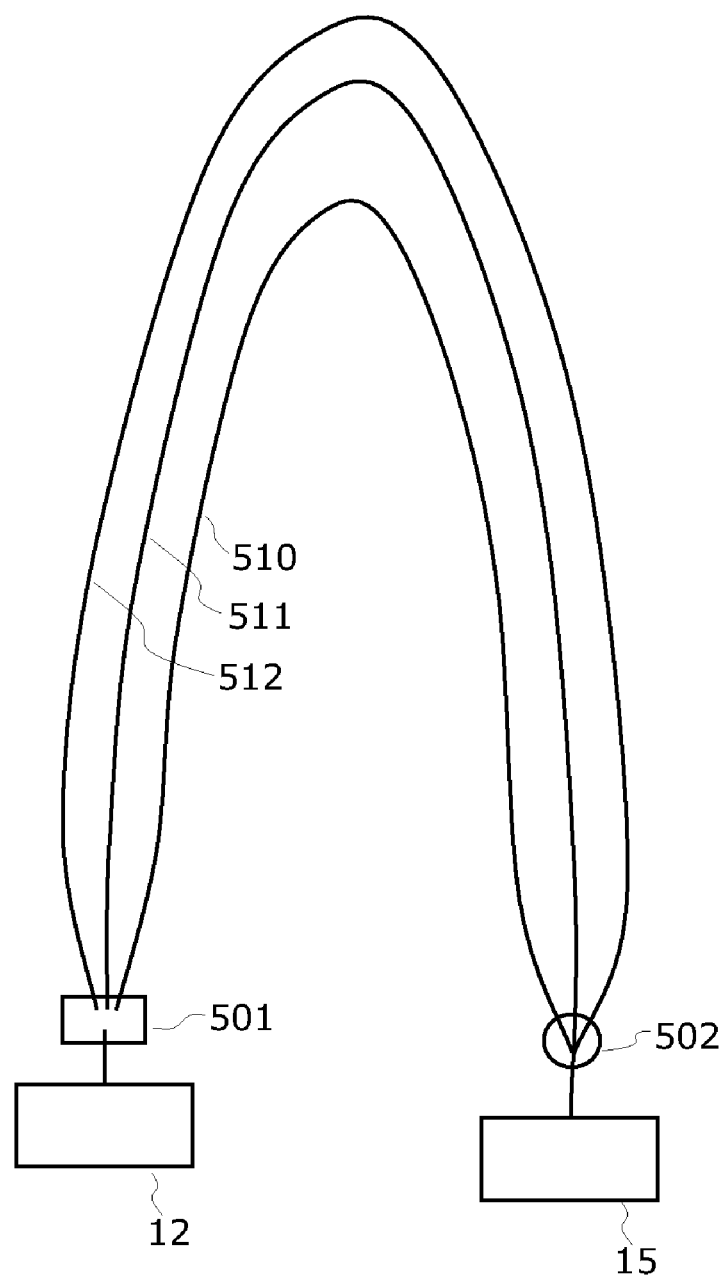
FIG. 5 illustrates an embodiment where a single detector is used for measuring the output optical signal from two or more fibres.

FIG. 5 shows an embodiment of the invention where the output optical signal from two or more fibres 510-512 are measured using a single optical spectrum detector 15. The output optical signals from the plurality of optical fibres 510-512 are combined into a single output optical signal that can be measured with a single detector 15. The combining of the optical signals from optical fibres 510-512 into a single optical signal may be achieved by use of an N:1 fibre coupler 502 or other optical coupling means 502 such as a lens for focussing the optical output beams into a single detector 15. In order to distinguish the optical output signal of a first fibre 510 from the optical output signal of a second fibre 511, the input optical signals inputted to optical fibres 510-512 may be inputted alternately using time division. The time division of the input optical signals may be achieved by use of an optical switch 501, which switches the light from the input source 12 to the first fibre 510 during a first time interval T1, and switches the light from the input source 12 to the second fibre 511 during a subsequent time interval T2, and so forth. Alternatively, time division of the input optical signals may be achieved by use of individual controllable input optical sources 12 operatively connected to each fibre 510-512 and alternately switching the input sources 12 on. By temporally synchronising the time division of the input optical signal to the detector 15 or a control unit used for processing the output optical signal, strain values from individual fibres 510-512 can be determined alternately.

Instead of using a single detector 15 for a plurality of fibres 510-512 it is also possible to use a detector 15 for each fibre 510-512. However, in this case it is not necessary to use time division of the input optical signal.

Figure 6:
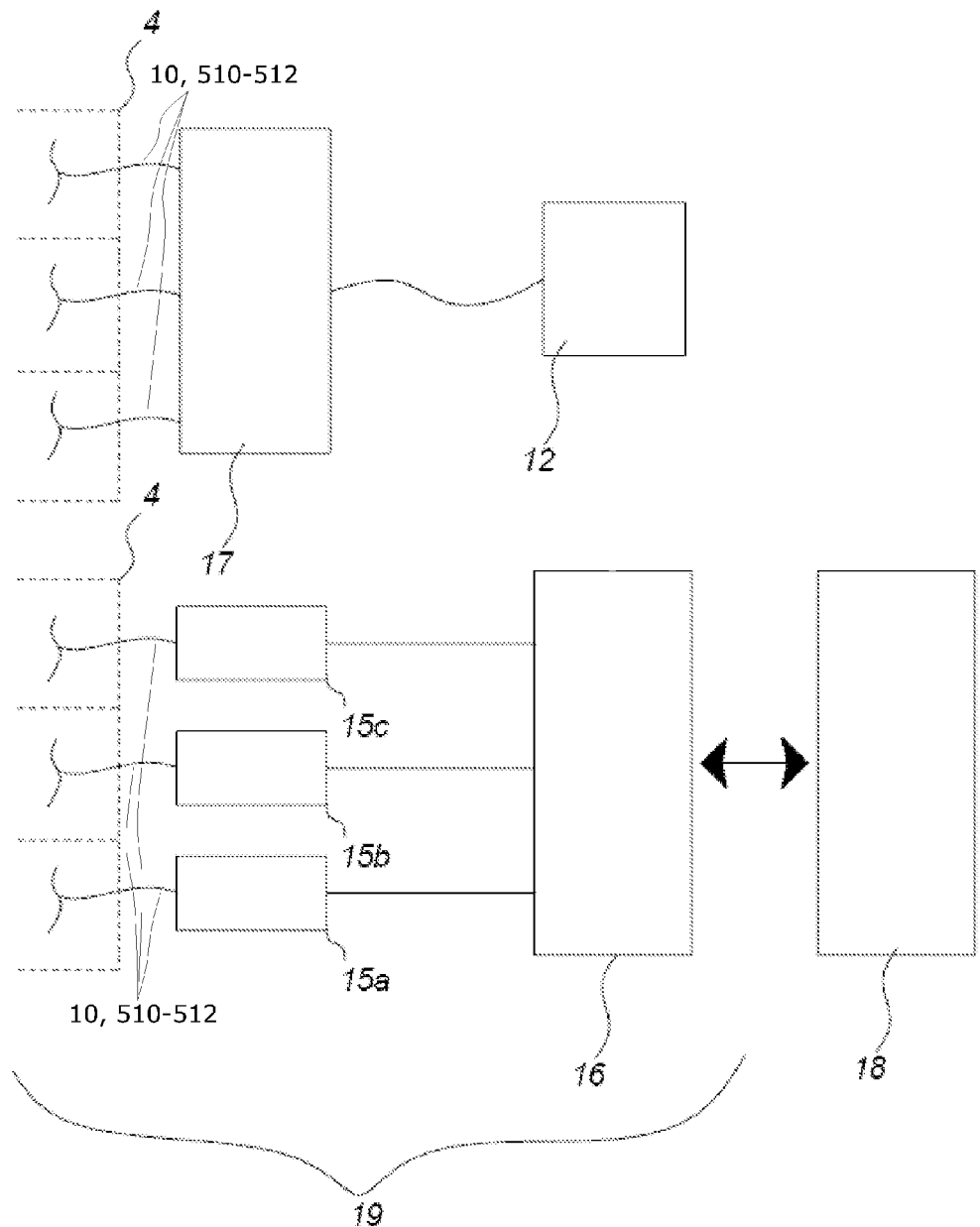
FIG. 6 illustrates a strain sensing system with three optical fibres and controller.

FIG. 6 shows an embodiment of a strain sensing system where the light from the optical source 12 is split into three fibres 10,510 using a fibre splitter 17. In the other end of the fibres, three spectral light detectors 15a-15c optically connected to the ends of the fibres 10,510, measures the spectral intensity distributions 431 of light outputted from the fibres. The fibres 10,510 comprising FBG strain sensors 9a-9f are fixed to a wind turbine component 4, for example three turbine blades.

The control unit 16 processes the measurements provided by the detectors 15a-15c for determining the spectral locations of intensity notches 412 and strain values of FBG sensors attached to different places at the three turbine blades.

The control unit 16 does not need to be connected to the input source 12. However, if synchronising between the control unit 16 and an optical switch 501 is used, a connection may be provided between the control unit 16 and the input controller or switch 501 for enabling the synchronisation.

When a turbine blade bends or stretches e.g. due to wind effects, the length of the mounted fibre 510,10 and the sensors 9a-9f changes, whereby the spectral location of intensity notches 412 of transmitted light changes. The light detector 15 measures the spectral changes of the transmitted light and provides the control unit 16 with data samples of the measured spectral intensity profile for determination of strain values.

In an embodiment of the invention, the bandwidth of the strain sensing system should be large enough to determine structural vibrations of the wind turbine blades. Depending on the vibration modes of the blades, the bandwidth of the strain sensing system should be greater than 5 Hz, preferable greater than 10 Hz, or greater than 20 Hz. In order to determine structural vibrations of higher frequencies and/or with greater accuracy, if may be desirable to the strain sensing system with a bandwidth of 25 Hz or even 50 Hz. Thus, if the bandwidth of the strain sensing system is greater than 20 Hz, structural vibrations with a vibration frequency of at least 10 Hz can be determined. A strain sensing system with a high bandwidth, e.g. higher than 20 Hz, may be obtained by using detectors 15 having a high optical sensitivity or by using an optical input source 12 having a high output optical power. An input light source 12 having an optical power of 100 nW (0.1 micro Watt) may be sufficient for determining strain values with a reasonable bandwidth. However, increasing the input power also enables design of a strain sensing system with higher bandwidth and, therefore, an input power of 10 or 100 micro Watt may be required for high band width systems.

The strain values from the control unit 16 may be used in the overall wind turbine control in order to decrease the maintenance costs of the components and increase the reliability of the wind turbine as such. E.g. if the strain values are approaching a too high level, the wind turbine may be controlled to reduce the strain values, or even stop the wind turbine.

The strain values may be used in the pitch control of at least one wind turbine blade and/or in the power generation control of the wind turbine. Hereby it is possible to reduce the strain of a wind turbine component e.g. by pitching a wind turbine blade more or less out of the wind and reducing the power generation of the wind turbine in a period of significant wind gusts. Similarly, the pitch control may be used for optimising generation of power by adjusting the pitch until a certain pressure on one or more turbine blades has been achieved, where the pressure is determined from measured strain values.

Although the present invention has been described in connection with the specified embodiments, it is not intended to be limited to the specific form set forth herein. Rather, the scope of the present invention is limited only by the accompanying claims. In the claims, the term "comprising" does not exclude the presence of other elements or steps. Additionally, although individual features may be included in different claims, these may possibly be advantageously combined, and the inclusion in different claims does not imply that a combination of features is not feasible and/or advantageous. In addition, singular references do not exclude a plurality. Thus, references to "a", "an", "first", "second" etc. do not preclude a plurality. Furthermore, reference signs in the claims shall not be construed as limiting the scope.

The invention claimed is:

1. A method for sensing strain in a component in a wind turbine comprising an optical sensor system, said method comprising:

inputting an input optical signal into a plurality of optical fibers of said sensor system, each of said optical fibers comprising one or more fiber Bragg grating sensors;

measuring a spectral intensity distribution of a transmitted output optical signal influenced by said one or more sensors, in response to the input optical signal, with a plurality of light detectors, said light detectors being operatively connected to the optical fibers with first and second detectors connected to respective first and second fibers, and with said first and second detectors being located downstream relative to said one or more sensors of said respective first and second fibers; and processing the measured output optical signal in a control unit in order to establish a value of a strain in the component wherein the output optical signal comprises at least one notch representing a minimum light intensity, and the strain value is established by determining a spectral location of the at least one notch in the measured spectral intensity distribution.

2. The method of claim 1, wherein the spectral intensity distribution of the output optical signal is measured with the light detector over a spectral range covering a spectral operating range of the one or more fiber Bragg grating sensors.

3. The method of claim 1, wherein the first and second optical fibers are operatively connected to the component of the wind turbine.

4. The method of claim 1, wherein the input optical signal is a broad band optical signal with a spectral distribution that is broader than a spectral operating range of the one or more fiber Bragg grating sensors.

5. The method of claim 1, wherein a light intensity of the transmitted output optical signal is compared with a light intensity of the input optical signal.

6. The method of claim 1, wherein the input optical signal is alternately inputted to the first and second optical fibers using time division, and where output optical signals from the first and second optical fibers are combined into a single output optical signal.

7. The method of claim 1, wherein said value of the strain is supplied to a wind turbine controller.

8. The method of claim 1, wherein said value of the strain is used in pitch control of at least one wind turbine blade or in power generation control of the wind turbine.

9. An optical strain sensing system for a wind turbine component, the strain sensing system comprising
a plurality of optical fibers which are operatively connected to said turbine component and each optical fiber comprising one or more fiber Bragg grating sensors;
an input optical signal source connected to said optical fibers at a location upstream to said one or more sensors;
a plurality of spectral light detectors operatively connected to the optical fibers with first and second detectors connected to respective first and second optical fibers, and with said first and second detectors being located at a location downstream of the one or more sensors of said respective first and second optical fibers, said light detectors being arranged for measuring a spectral intensity distribution of transmitted output optical signals influenced by one or more of said sensors of said optical fibers; and
at least one control unit for processing the measured output optical signals in order to establish a value of a strain in the component
wherein at least one of the output optical signals comprises at least one notch representing a minimum light intensity, and the strain value is established by determining a spectral location of the at least one notch in the measured spectral intensity distribution.

10. The strain sensing system of claim 9, wherein the wind turbine component comprises first and second turbine blades, and the first and second optical fibers are respectively fixed to the first and second turbine blades.

11. The strain sensing system of claim 9, wherein the system comprises data storage means for keeping record of the strain in the wind turbine component in order to estimate remaining safe working condition of the component.

12. A wind turbine comprising:
an optical strain sensing system according to claim 9.

\* \* \* \* \*

UNITED STATES PATENT AND TRADEMARK OFFICE
CERTIFICATE OF CORRECTION

PATENT NO. : 8,120,759 B2
APPLICATION NO. : 12/935728
DATED : February 21, 2012
INVENTOR(S) : Ib S. Olesen It is certified that error appears in the above-identified patent and that said Letters Patent is hereby corrected as shown below:

In the claims:

At column 10, claim number 1, line number 67, after "component", insert --,--.

At column 12, claim number 9, line number 15, after "component", insert --,--.

Signed and Sealed this
Twenty-fifth Day of September, 2012

David J. Kappos
*Director of the United States Patent and Trademark Office*